May 5, 1970     O. C. BROSS, JR     3,509,657

LIVE BAIT CONTAINER

Filed Oct. 30, 1967

ORVAL C. BROSS, JR.
INVENTOR.

BY

Robert K. Rhea
AGENT

United States Patent Office 3,509,657
Patented May 5, 1970

3,509,657
LIVE BAIT CONTAINER
Orval C. Bross, Jr., Rte. 3, Box 239,
Guthrie, Okla. 73044
Filed Oct. 30, 1967, Ser. No. 679,269
Int. Cl. A01k *97/04*
U.S. Cl. 43—57                1 Claim

ABSTRACT OF THE DISCLOSURE

An upwardly open outer container is transversely divided adjacent one end to form a water tight compartment above a pump compartment. A perforated wall minnow container is telescopingly received loosely by the outer container. A motor, in the water tight compartment, is drivably connected with a pump having a conduit connected with its output end and an air tube connected with the conduit for circulating the water and injecting air to aerate the water.

Background of the invention

The present invention relates to live bait containers and more particularly to a portable tank or container for maintaining the life of live bait, such as minnows.

It is well known that the oxygen contained by water in a minnow bucket will not sustain fish life except for a relatively short time, particularly when the temperature is relatively high, such as during the summer months. It is, therefore, desirable from a fisherman's view point to provide a means whereby minnows may be maintained in a healthy condition while fishing and when transporting the minnows to a desired fishing location. Several attempts have been made to aerate water contained by a minnow bucket but these devices, for the most part, have not been generally accepted. Most of the prior patents provide a means to lift the water and spray it back into the container to pick up air as it falls while others agitate the water by a propeller to create a churning action as disclosed by Patent No. 3,323,249.

The patent to Abell No. 2,865,618 discloses the use of a submerged propeller for churning the water and drawing air downwardly into the water.

These prior patents operate satisfactorily but have proved relatively expensive and do not include a provision wherein an insert portion of the bucket may be removed and placed in the water being fished to maintain minnow life as a convenience while fishing and to prolong the source of electrical energy such as a battery used in operating the device.

This invention overcome the above objections by providing a pump driven by a motor requiring an inexpensive source of electrical energy, such as flash light batteries, wherein the pump draws air into the water by a jet action. A separate float equipped minnow container is removable from the outer jacket to be placed in the water being fished.

Summary of the invention

An upwardly open outer water tight container is transversely divided adjacent one end to form an upper motor compartment and a lower pump compartment. A motor in the motor compartment is drivably connected with a submersed pump which circulates water through the pump compartment and discharges the water centrally of the lower limit of the outer compartment. An air tube, communicating with the atmosphere and a pump connected conduit near its ejection end, pulls air into the water by a jet action during operation of the pump. An insert minnow container having perforated lower walls and a float member at its upper limit is removably received loosely by the outer container.

The principal object of the present invention is to provide a two-piece minnow bucket having a motor and pump means connected with conduit and tubing for aerating water contained by the minnow bucket to prolong fish life.

Description of the preferred embodiment

Figure 2:
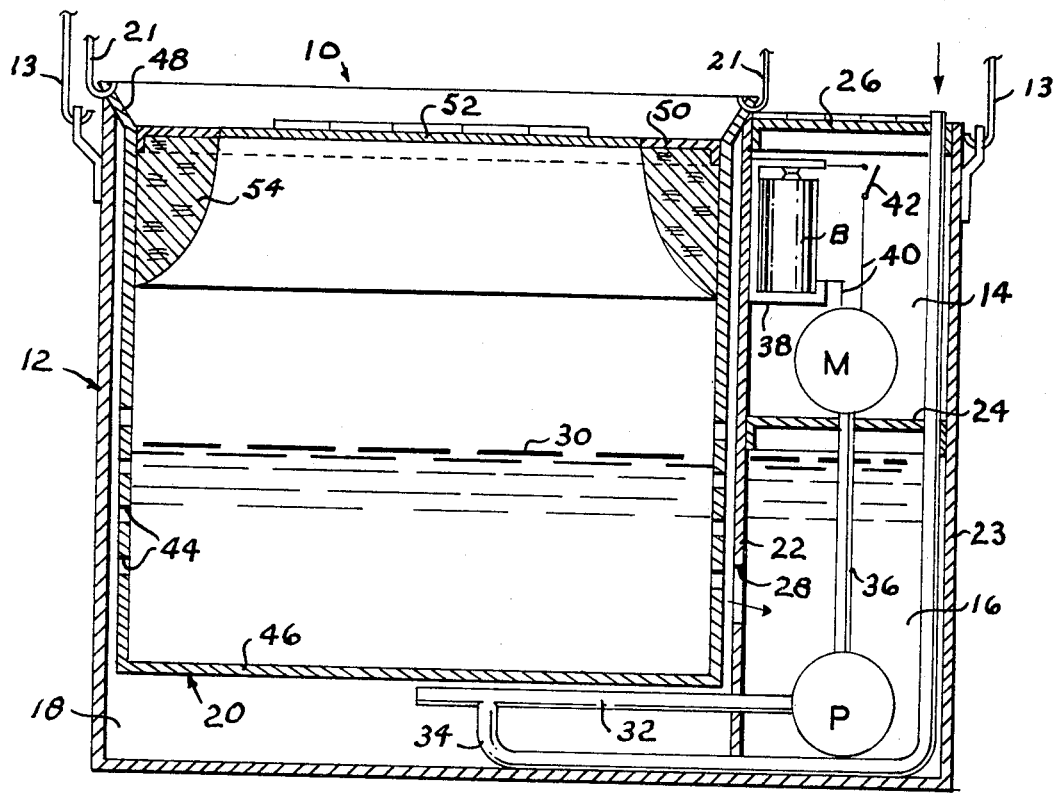
FIGURE 2 is a vertical cross-sectional view taken substantially along the line 2—2 of FIG. 1; and,
FIGURE 3 is a perspective view of the minnow containing bucket insert illustrating its access lid in open position by dotted lines.
Figures 1, 3:
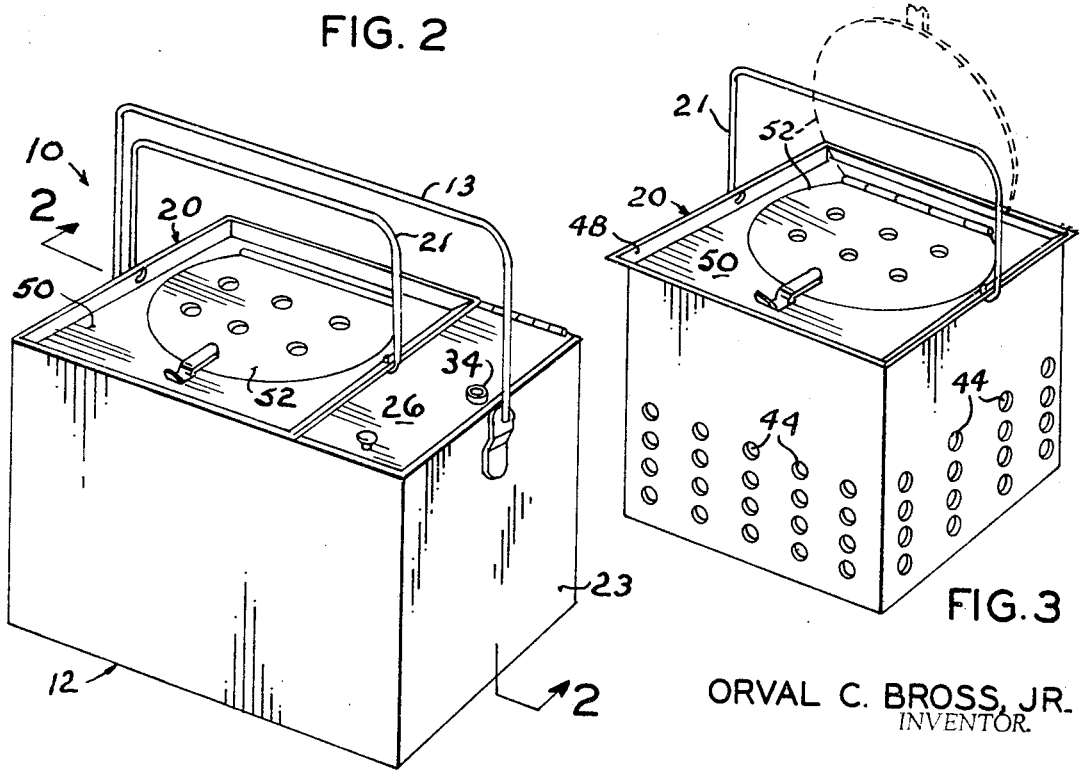
FIGURE 1 is a perspective view of the minnow bucket.

Like characters of references designate like parts in those figures of the drawings in which they occur.

In the drawings:

The reference numeral 10 indicates a minnow bucket, as a whole, comprising an outer upwardly open rectangular container 12 having a pivotally connected bail 13, an upper water tight motor compartment 14 at one end, a pump compartment 16 and a larger water containing compartment 18 which loosely receives a substantially square insert fish container 20 having a pivotally connected bail 21. The motor compartment is formed by a vertically disposed partition wall 22 which extends transversely across the container 12 in spaced relation with respect to one of its end walls 23. A horizontal partition 24 extends between the end 23 and the respective side walls of the container 12 and partition 22 to form the bottom wall of the motor compartment 14. A lid 26, hingedly connected to the outer container 12, opens and closes the compartment 14. One or more apertures 28, formed in the partition wall 22 below the horizontal partition 24, permits water, indicated at 30, to seek its level within the pump compartment 16.

A pump P is placed within the pump compartment 16 adjacent the bottom wall of the container 12. The output port of the pump is connected with a conduit 32 which extends through the partition 22 and terminates at its open end in spaced relation with respect to the bottom wall of the container 12 and substantially centrally of the compartment 18. A tube 34 is connected at one end to the conduit 32 adjacent but spaced from the open end of the conduit. The tube 34 extends through the partition wall 22, upwardly through the pump compartment 14 terminating at its other open end slightly above the upper limit of the lid 26 for the purposes presently explained.

A motor M is mounted within the closed compartment 14. The motor has its drive shaft 36 projecting downwardly through the horizontal partition 24 and drivably connected to the pump P. A battery B, such as a flash light battery, is mounted on a suitable bracket 38 positioned within the compartment 14. The battery is connected to the motor M by wires 40 through a switch 42.

The fish containing insert container 20 is provided with a plurality of vertically spaced apertures 44 in its wall area with the lowermost row of apertures 44 spaced upwardly of its bottom wall 46 a selected distance. The purpose of the apertures 44 is to permit the water 30 to circulate through the container 20 as hereinafter described.

As shown in FIG. 2, the overall dimensions of the container 20 is less than the inside dimensions of the compartment 18 so that the container 20 may be inserted and removed easily. The respective walls of the container 20, adjacent their upper limit, are flared outward and upwardly in diverging relation, as at 48, so that the respective outer surface of these wall flared portions engage the upper edge surface of the walls forming the outer container 12 and the partition 22 to support the container 20 in spaced relation with respect to the bottom wall of the outer container 12 and in close spaced relation with respect to the conduit 32. The pivotal bail 21 is connected with opposing ones of the flared walls 48. The container 20 is provided with a horizontal top 50 which extends between and is connected with its respective walls at their juncture with the outwardly flared portions 48. The top wall 50 is centrally apertured and provided with a hingedly connected vertically perforated lid or cover 52 for access to the interior of the container 20. A buoyant member, such as a material having closed cells or which may be cork 54, extends around and is connected to the interior surface of the walls of the container 20 adjacent the depending surface of the top wall 50. The purpose of the float member 54 is to maintain the container 20 in an upright floating position when the container is positioned within water being fished.

Operation

In operation the bucket is assembled as shown and described and with the insert container 20 in place, a desired quantity of water is placed within the bucket preferably to a level near the plane of the horizontal partition 24 and live bait such as minnows, not shown, is placed within the insert container 20. The switch 42 is closed which energizes the motor M and operates the pump P. The water 30 is picked up by the pump P and exhausted through the open end of the conduit 32. This stream of water passing through the conduit 32 pulls air from the atmosphere through the tube 34 and mixes it with the water in a jet action. This oxygen filled water then circulates freely through the insert container apertures 44 and back to the pump P through the partition wall aperture 28. When the fishing location has been reached the insert container 20 may be lifted out of the outer container 12 and placed within the waters to be fished where the float member 54 maintains the container 20 with its top wall and lid 52 near the surface of the waters.

Obviously the invention is susceptible to some change or alteration without defeating its practicability, and I therefore do not wish to be confined to the preferred embodiment shown in the drawings and described herein.

I claim:

1. A live bait container, comprising: an outer container having a vertical partition defining two intercommunicating water containing compartments and having a horizontal partition connected with said vertical partition and the inner wall surface of said outer container forming a water tight motor compartment; an inner container telescopingly received by one said water containing compartment, said inner container having a plurality of apertures in the depending portion of its walls and having the upper edge portions of its walls flared outwardly in diverging relation to form a support for said inner container when placed within said outer container; a lid for opening and closing said inner container; a float member secured to the inner wall surface of said inner container adjacent said lid; a pump within the other said water containing compartment; means for operating said pump including a motor in said water tight compartment, said motor having a drive shaft projecting downward through said horizontal partition and connected with said pump, and a battery connected with said motor; tubular means connected with said pump including a conduit having a free end disposed substantially central of and below an innermost end wall of said inner container, and a tube connected with said conduit adjacent its free end and having its other end portion terminating above the upper limit of said outer container and communicating with the atmosphere for adding air to the water during operation of said pump; and a bail pivotally secured to each other container.

References Cited

UNITED STATES PATENTS

| 2,207,514 | 7/1940 | Haldeman | 43—57 X |
| 2,515,538 | 7/1950 | Wall | 119—5 X |
| 2,639,906 | 5/1953 | Butler | 43—57 X |
| 2,998,671 | 9/1961 | Hinton | 43—57 |

HUGH R. CHAMBLEE, Primary Examiner